(12) United States Patent
Agalave et al.

(10) Patent No.: US 11,951,883 B2
(45) Date of Patent: Apr. 9, 2024

(54) STOW TO FLOOR SEAT ASSEMBLY

(71) Applicant: Magna Seating Inc., Aurora (CA)

(72) Inventors: Shriram Agalave, Bhosari (IN); Harshad Naikare, Bhosari (IN); Akshay Lamkane, Bhosari (IN); David Runde, Ortonville, MI (US); Cheikh Dioum, Farmington Hills, MI (US); Bruno Carraro, Ferndale, MI (US)

(73) Assignee: Magna Seating Inc., Aurora (CA)

( * ) Notice: Subject to any disclaimer, the term of this patent is extended or adjusted under 35 U.S.C. 154(b) by 406 days.

(21) Appl. No.: 17/441,946

(22) PCT Filed: Mar. 23, 2020

(86) PCT No.: PCT/US2020/024167
§ 371 (c)(1),
(2) Date: Sep. 22, 2021

(87) PCT Pub. No.: WO2020/198116
PCT Pub. Date: Oct. 1, 2020

(65) Prior Publication Data
US 2022/0161696 A1 May 26, 2022

Related U.S. Application Data

(60) Provisional application No. 62/822,360, filed on Mar. 22, 2019.

(51) Int. Cl.
*B60N 2/22* (2006.01)
*B60N 2/02* (2006.01)
(Continued)

(52) U.S. Cl.
CPC ....... *B60N 2/2209* (2013.01); *B60N 2/02246* (2023.08); *B60N 2/06* (2013.01);
(Continued)

(58) Field of Classification Search
CPC .......... B60N 2/12; B60N 2/856; B60N 2/309; B60N 2/3031; B60N 2/2209; B60N 2/06;
(Continued)

(56) References Cited

U.S. PATENT DOCUMENTS 6,464,297 B2   10/2002   Garrido et al.
7,188,883 B2   3/2007    Van Dyk et al.
(Continued)

FOREIGN PATENT DOCUMENTS

CA      2647879       10/2007
CN      109130966 A   * 1/2019   ........... B60N 2/0722
(Continued)

*Primary Examiner* — Lori Lyjak
(74) *Attorney, Agent, or Firm* — Miller Canfield

(57) ABSTRACT

A seat assembly includes a five-bar linkage for moving the seat assembly between a plurality of positions in an automotive vehicle. A first link is rotatably coupled to a seat back at a second pivot point disposed coaxial to a first pivot point, and to a seat base defining a fifth link at a third pivot point. A second link extends axially between the first and second pivot points. A third link is defined by a lower seat back portion and a seat cushion and extends between the first pivot point and a fifth pivot point disposed adjacent a front portion of the seat cushion. A fourth link is rotatably coupled to the third link at the fifth pivot point and the seat base at a fourth pivot point. The seat assembly is capable of moving to both a pitched easy entry position and a stow flat to floor position.

33 Claims, 13 Drawing Sheets

(51) Int. Cl.
  *B60N 2/06* (2006.01)
  *B60N 2/30* (2006.01)
  *B60N 2/856* (2018.01)
(52) U.S. Cl.
  CPC ........... *B60N 2/3031* (2013.01); *B60N 2/309* (2013.01); *B60N 2/856* (2018.02)
(58) Field of Classification Search
  CPC .. B60N 2/0224; B60N 2/3065; B60N 2/2222; B60N 2/02246
  See application file for complete search history.

(56) References Cited

U.S. PATENT DOCUMENTS

| | | | |
|---|---|---|---|
| 7,300,090 B2 | 11/2007 | Rana et al. | |
| 9,145,071 B2 | 9/2015 | Böhm et al. | |
| 9,592,749 B2 | 3/2017 | Boehm et al. | |
| 2010/0109404 A1 * | 5/2010 | Yamagishi | B60N 2/12 297/341 |
| 2019/0291608 A1 * | 9/2019 | Kong | B60N 2/1839 |

FOREIGN PATENT DOCUMENTS

| | | | | |
|---|---|---|---|---|
| DE | 202009006984 U1 * | 8/2009 | | B60N 2/12 |
| DE | 102009022568 A1 * | 11/2010 | | B60N 2/12 |
| GB | 2459696 A * | 11/2009 | | B60N 2/065 |
| WO | 2006128290 | 12/2006 | | |
| WO | 2009094756 | 8/2009 | | |
| WO | WO-2009127290 A1 * | 10/2009 | | B60N 2/12 |
| WO | WO-2015128316 A1 * | 9/2015 | | B60N 2/12 |
| WO | 2018046433 | 3/2018 | | |

\* cited by examiner

FIG. 4A
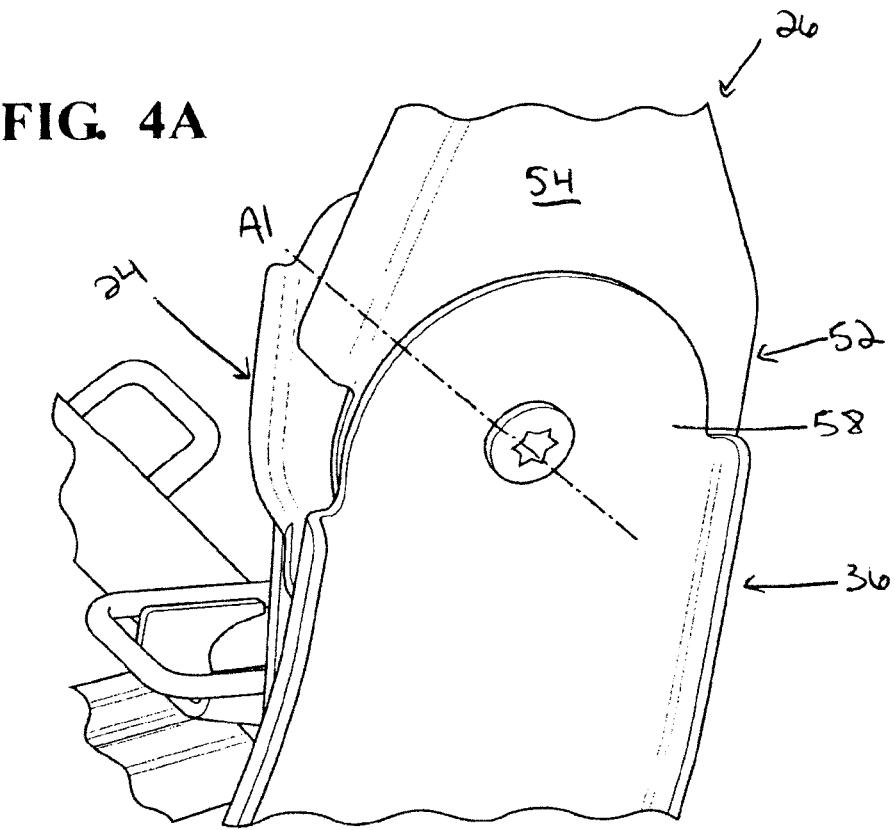
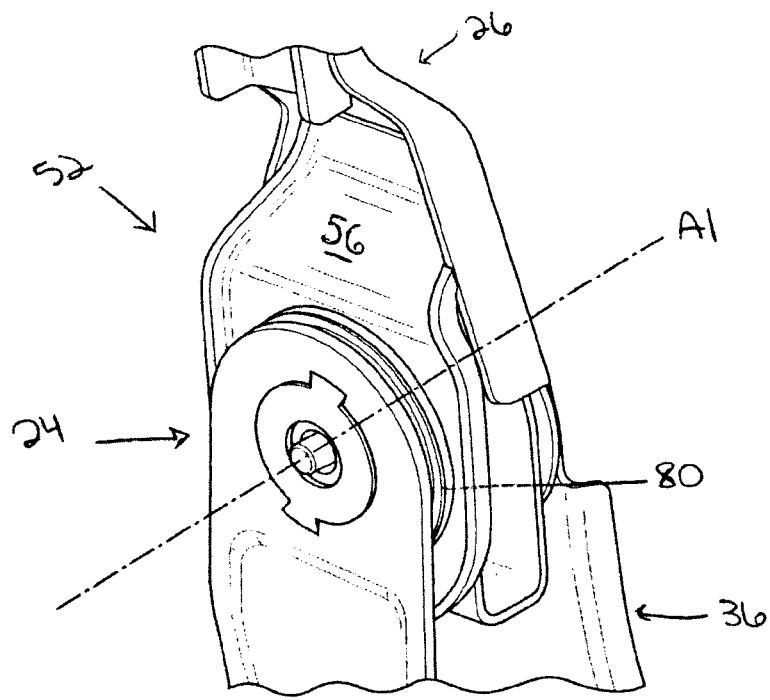
FIG. 4B

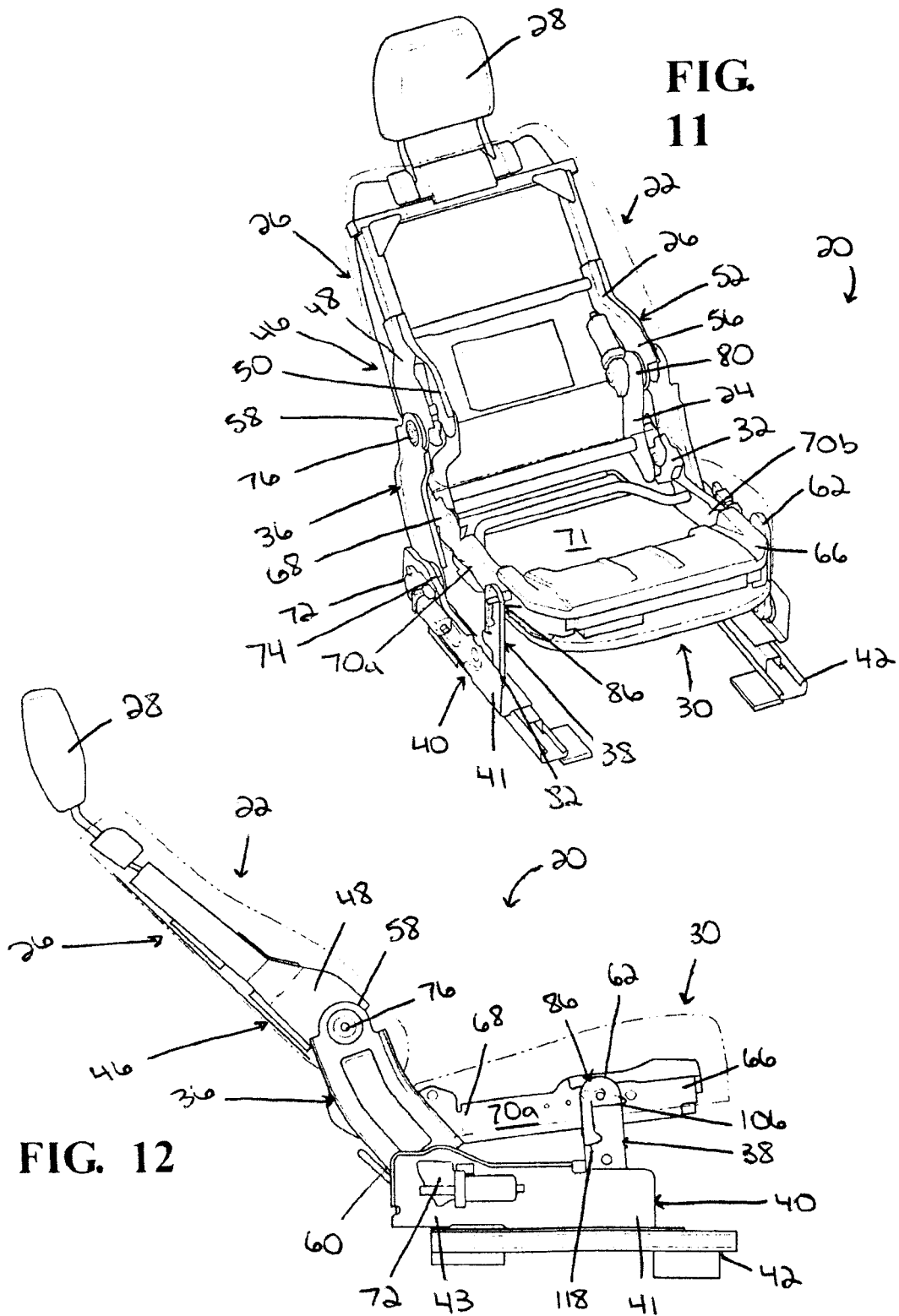

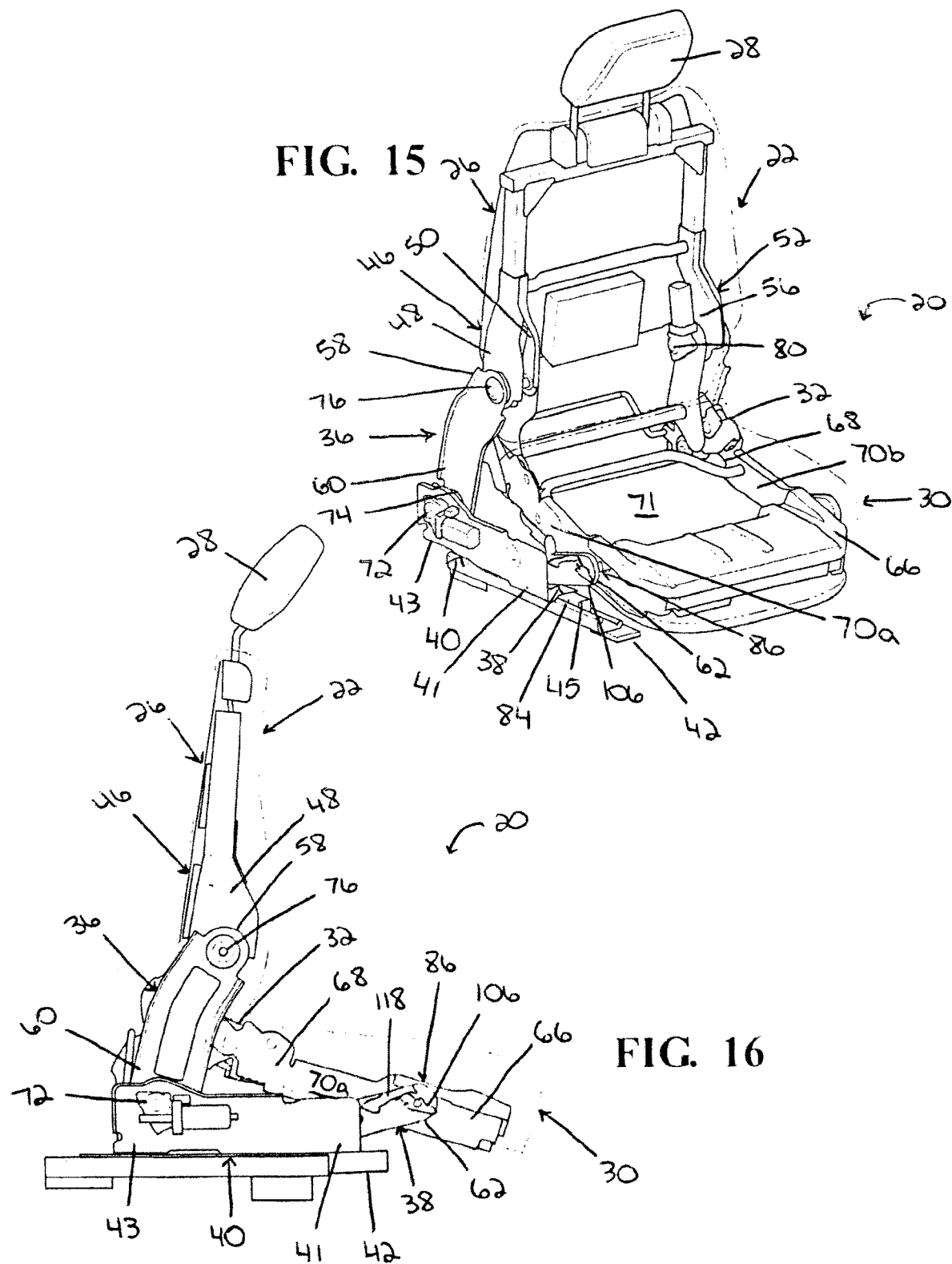

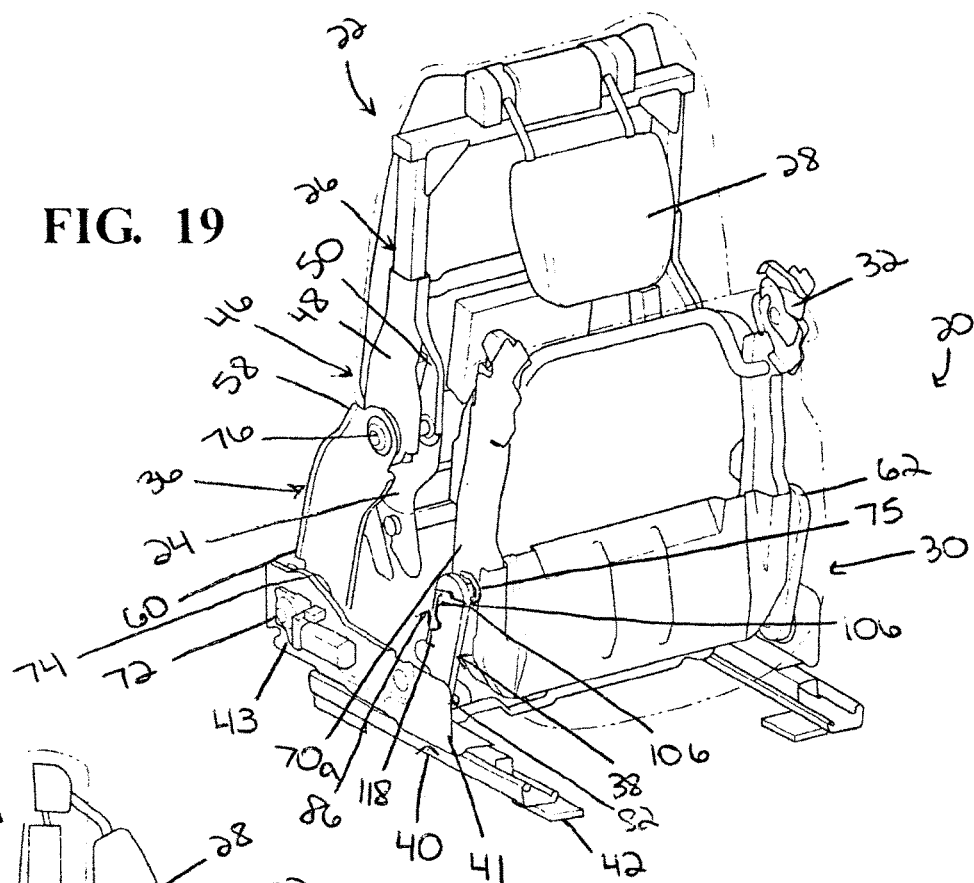

STOW TO FLOOR SEAT ASSEMBLY

CROSS-REFERENCE TO RELATED APPLICATIONS

This application claims priority to and all the benefits of U.S. Provisional Application 62/822,360, filed on Mar. 22, 2019, which is hereby incorporated by reference in its entirety.

BACKGROUND OF THE INVENTION

1. Field of the Invention

The present invention relates to a seat assembly for use in an automotive vehicle for movement between a plurality of positions.

2. Description of Related Art

Seat assemblies for use in an automotive vehicle for movement between a plurality of positions are known in the art. Typical seat assemblies include a seat cushion having a front portion and a rear portion for supporting an occupant in the automotive vehicle. A seat back is pivotally coupled to the seat cushion at a first pivot point. The seat assembly also includes a linkage for movement of the seat assembly to various seating and stowed positions within the automotive vehicle. Linkages known in the art are typically four-bar linkage systems. However, typical seat assemblies capable of stowing within the automotive vehicle require large amounts of space, either above or below a floor of the automotive vehicle. Additionally, many seat assemblies known in the art that are capable of stowing within the automotive vehicle are not able to also move to an easy entry position in which the seat assembly tilts forwardly and downwardly toward the floor of the automotive vehicle while containing an implement such as a child seat.

SUMMARY OF THE INVENTION

According to one aspect of the invention, a seat assembly for use in an automotive vehicle is provided for movement between a plurality of positions. The seat assembly includes a seat cushion having a front portion and a rear portion for supporting an occupant in the automotive vehicle. A seat back has a lower seat back portion pivotally coupled to an upper seat back portion at a first pivot point defusing a first axis. The lower seat back portion is releasably coupled to the rear portion of the seat cushion. The seat assembly also includes a five-bar linkage with a first, second, third, fourth, and fifth link. The first link extends between a first end and an opposite second end. The first end is rotatably coupled to the seat back at a second pivot point disposed coaxial to the first pivot point, and the second end defines a third pivot point. The second link extends axially between the first and second pivot points. The third link is defined by the lower seat back portion and the seat cushion and extends between the first pivot point and a fifth pivot point disposed adjacent the front portion of the seat cushion. The fourth link extends between a first end and an opposite second end. The first end is rotatably coupled to the third link at the fifth pivot point, and the second end defines a fourth pivot point. The fifth link is defined between the third pivot point and the fourth pivot point.

BRIEF DESCRIPTION OF THE DRAWINGS

Advantages of the present disclosure will be readily appreciated as the same becomes better understood by reference to the following detailed description when considered in connection with the accompanying drawings, wherein:

FIG. 4A is an enlarged fragmentary perspective view of a lateral side of a second attachment arm of the seat assembly of FIG. 1;

FIG. 4B is an enlarged fragmentary perspective view of a medial side of the second attachment arm of the seat assembly of FIG. 1;

FIG. 11 is a perspective view of the seat assembly of FIG. 1 in a comfort recline position;

FIG. 12 is a side view of the seat assembly of FIG. 1 in the comfort recline position;

FIG. 15 is a perspective view of the seat assembly of FIG. 1 in an easy entry position;

FIG. 16 is a side view of the seat assembly of FIG. 1 in the easy entry position;

FIG. 19 is a perspective view of the seat assembly of FIG. 1 in a stadium position;

FIG. 20 is a side view of the seat assembly of FIG. 1 in the stadium position.

DETAILED DESCRIPTION OF THE EMBODIMENTS

Figure 1:
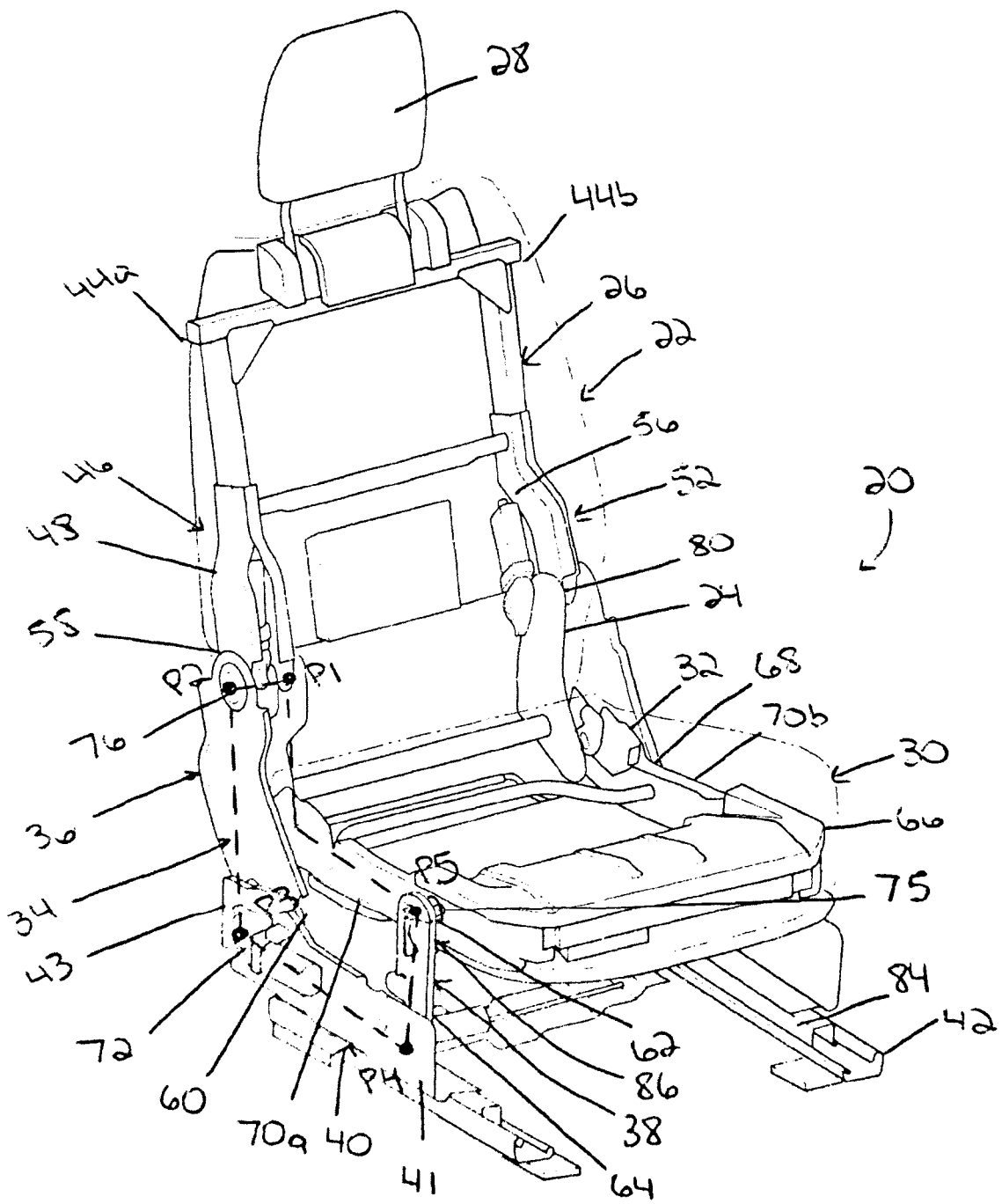
FIG. 1 is a perspective view of a seat assembly for use in an automotive vehicle in a design position according to one embodiment of the present invention.

Referring to the Figures, wherein like numerals indicate like or corresponding parts throughout the several views, a seat assembly adapted to be mounted to a floor of an automotive vehicle is shown generally at 20. The seat assembly 20 includes a seat back 22 with a lower seat back portion 24 and an upper seat back portion 26, wherein the lower seat back portion 24 is pivotally coupled to the upper seat back portion 26 at a first pivot point P1 defining a first axis A1. A headrest 28 is pivotally coupled to the upper seat back portion 26 and is moveable between a generally upright position and a folded position in which the headrest 28 pivots toward and overlaps the upper seat back portion 26. A seat cushion 30 for supporting an occupant in the automotive vehicle is releasably coupled to the lower seat back portion 24 by a latching mechanism 32 for selectively unlocking the seat cushion 30 from the seat back 22. The seat cushion 30 includes a top padded side 31 for occupant comfort disposed opposite a bottom hard side 33 for protecting the seat cushion 30, and the seat back 22 similarly includes a front padded side 23 for occupant comfort disposed opposite a back hard side 25 for protecting the seat back 22. The seat assembly 20 further includes a five-bar linkage 34 rotatable for moving the seat assembly 20 between a plurality of positions, including a design position, a comfort recline position, an easy entry position, a stow to floor position, a fold forward position, and a stadium position. The seat back 22 and seat cushion 30 are supported above the floor of the automotive vehicle by a pair of spaced apart rear legs 36 and a pair of spaced apart front legs 38, wherein each rear leg 36 defines a first link of the five-bar linkage 34, and each front leg 38 defines a fourth link of the five-bar linkage 34. The rear and front legs 36, 38 are rotatably coupled to a seat base 40 defining a fifth link of the five-bar linkage 34, the seat base 40 extending between a front portion 41 and a rear portion 43. The seat base 40 may be mounted directly to the floor of the automotive vehicle or coupled to a seat track assembly 42 for providing fore and aft movement of the seat assembly 20 in the automotive vehicle.

Figure 2:
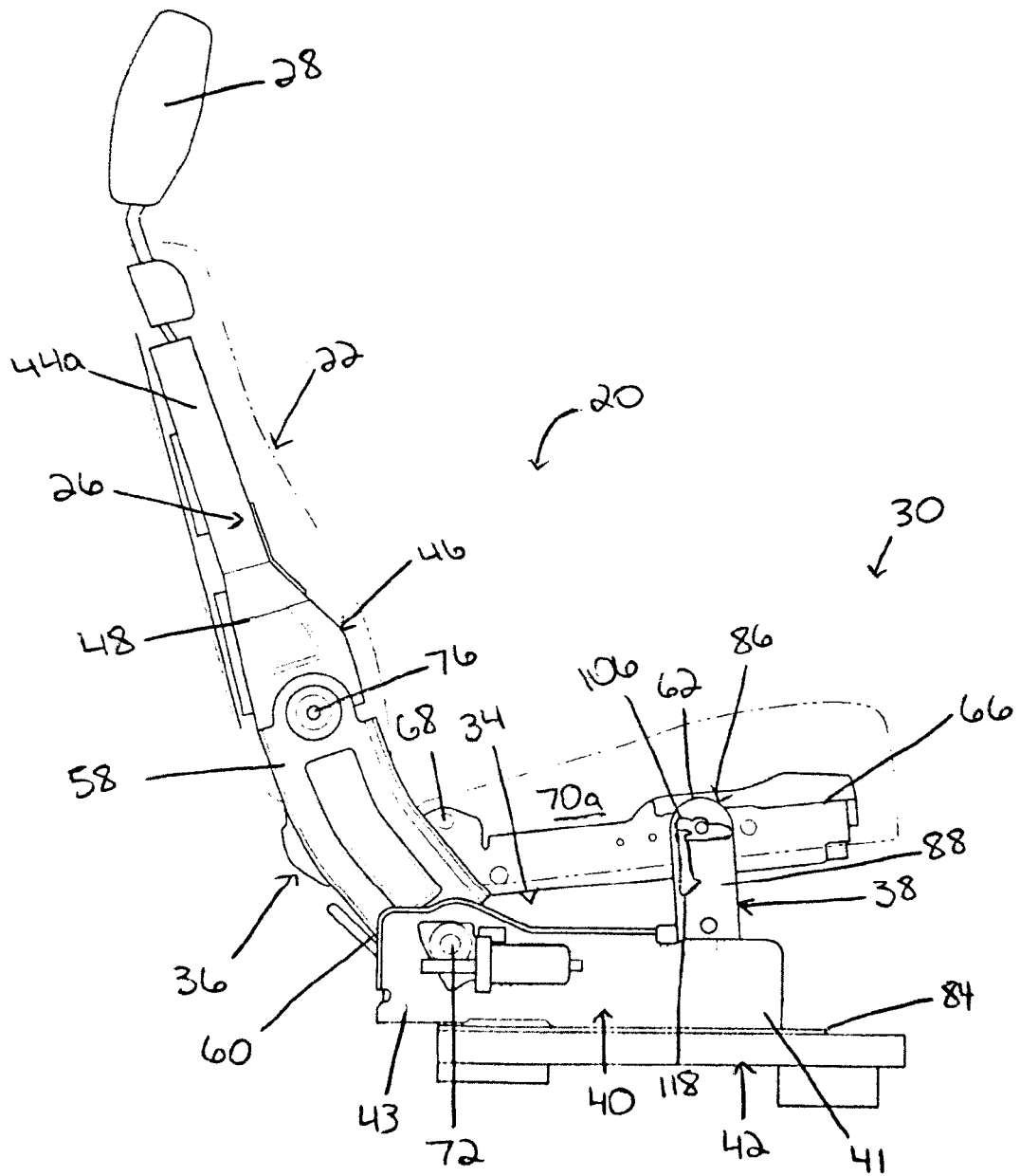
FIG. 2 is a side view of the seat assembly of FIG. 1 in the design position.
Figure 3A:
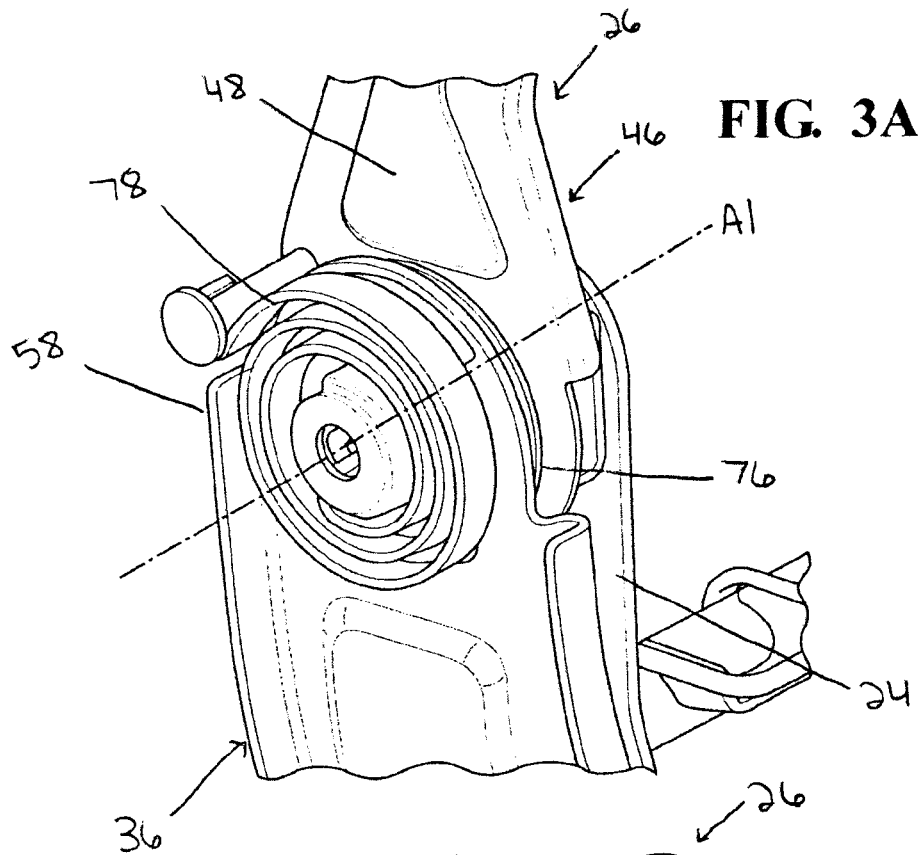
FIG. 3A is an enlarged fragmentary perspective view of a lateral side of a first attachment arm of the seat assembly of FIG. 1.
Figure 3B:
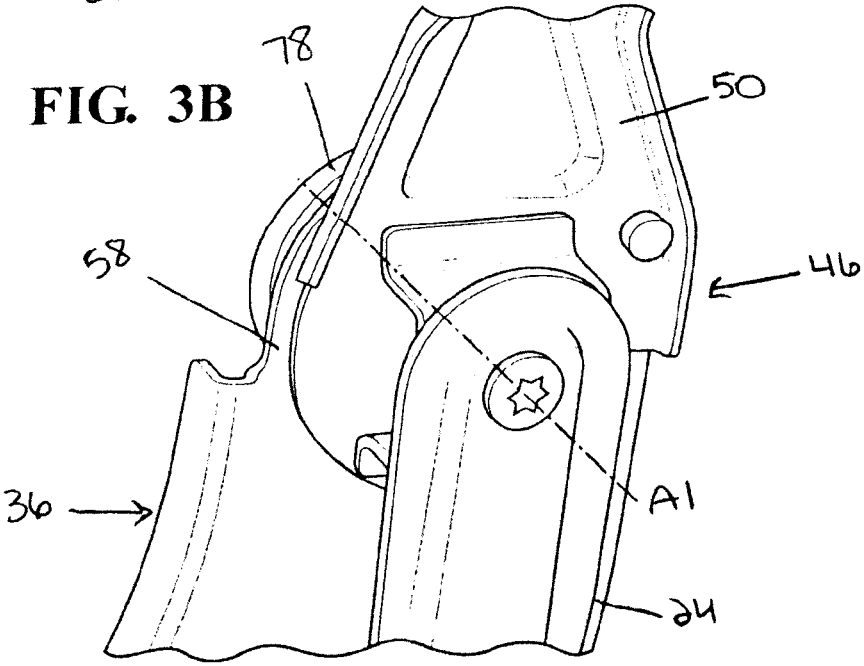
FIG. 3B is an enlarged fragmentary perspective view of a medial side of the first attachment arm of the seat assembly of FIG. 1.

Referring to FIGS. 1 and 2, the upper seat back portion 26 extends laterally between opposite first and second sides 44a, 44b. The first side 44a includes a first attachment arm 46 with opposite lateral 48 and medial sides 50, and the second side 44b similarly includes a second attachment arm 52 with opposite lateral 54 and medial sides 56. The lower seat back portion 24 is pivotally coupled to the medial sides 50, 56 of the first and second attachment arms 46, 52, as shown in FIGS. 3B and 4B. Each rear leg 36 extends between a first end 58 and an opposite second end 60. The first ends 58 of the rear legs 36 are rotatably coupled to the lateral sides 48, 54 of the first and second attachment arms 46, 52 at a second pivot point P2, as shown in FIGS. 3A and 4A. The second pivot point P2 is disposed coaxial to the first pivot point P1, defining a second link of the five-bar linkage 34 extending axially between the first and second pivot points P1, P2. The second ends 60 of the rear legs 36 are rotatably coupled to the rear portion 43 of the seat base 40 at a third pivot point P3.

The seat cushion 30 extends longitudinally between a front portion 66 and a rear portion 68 with opposite lateral sides 70a, 70b. The seat cushion 30 further includes an interior portion 71 disposed between the lateral sides 70a, 70b. Each front leg 38 extends between a first end 62 and an opposite second end 64. The first ends 62 of the front legs 38 are rotatably coupled to the front portion 66 of each lateral side 70a, 70b of the seat cushion 30 at a fifth pivot point P5. The second ends 64 of the front legs 38 are rotatably coupled to the front portion 41 of the seat base 40 at a fourth pivot point P4. A third link of the five-bar linkage 34 is defined by the lower seat back portion 24 and the seat cushion 30 and extends between the first pivot point P1 and the fifth pivot point P5.

A third pivot locking mechanism 72 is operably coupled between the rear portion 43 of the seat base 40 and the second end 60 of the rear leg 36 for selectively locking and unlocking the rear leg 36 at the third pivot point P3, thereby selectively preventing and allowing rotation between the rear leg 36 and the seat base 40. A third pivot biasing mechanism 74, such as a torsion spring, is also disposed at the third pivot point P3 to provide a biasing force sufficient to rotatably bias the second end 60 of the rear leg 36 in a second direction (clockwise when viewed from FIGS. 2, 12, 14, 16, 18, and 20).

Referring to FIGS. 3A and 3B, a second pivot locking mechanism 76 is operably coupled between the first end 58 of the rear leg 36 and the lateral side 48 of the first attachment arm 46 for selectively locking and unlocking the rear leg 36 at the second pivot point P2, thereby selectively preventing and allowing rotation between the upper seat back portion 26 and the rear leg 36. A second pivot biasing mechanism 78, such as a torsion spring, is also disposed at the second pivot point P2 to provide a biasing force sufficient to rotatably bias the upper seat back portion 26 in the second direction (clockwise when viewed from FIGS. 2, 12, 14, 16, 18, and 20). Similarly, referring to FIGS. 4A and 4B, a first pivot locking mechanism 80 is operably coupled between the medial side 56 of the second attachment arm 52 and the lower seat back portion 24 for selectively locking and unlocking the seat back 22 at the first pivot point P1, thereby selectively preventing and allowing rotation between the lower and upper seat back portions 24, 26. The seat assembly 20 further includes a fourth pivot biasing mechanism 82, such as a torsion spring, disposed at the fourth pivot point P4 to provide a biasing force sufficient to rotatably bias the second end 64 of the front leg 38 in the second direction (clockwise when viewed from FIGS. 2, 12, 14, 16, 18, and 20). Similarly, a fifth pivot biasing mechanism 75, such as a torsion spring, is disposed at the fifth pivot point P5 to provide a biasing force sufficient to rotatably bias the seat cushion 30 in the second direction (clockwise when viewed from FIGS. 2, 12, 14, 16, 18, and 20).

One potential type of locking mechanism for use at the first, second, and third pivot points P1, P2, P3 is a disc recliner mechanism as described in U.S. Pat. No. 8,459,743, the disclosure of which is hereby incorporated by reference in its entirety. However, it is to be appreciated that any suitable locking mechanism known in the art could be substituted without varying the scope of the invention. For example, the locking mechanisms could be manual recliners, power recliners, or a combination thereof. Further, it is to be appreciated that the seat assembly 20 may include any number of locking mechanisms disposed at the first and second attachment arms 46, 52, or may omit the locking mechanisms entirely, without varying the scope of the invention. For example, one alternative embodiment may include locking mechanisms disposed on both the medial and lateral sides 48, 50 of the first attachment arm 46, and locking mechanisms disposed on both the medial and lateral sides 54, 56 of the second attachment arm 52. Conversely, a second alternative embodiment may include locking mechanisms disposed on both the medial and lateral sides 54, 56 of the second attachment arm 52, and a locking mechanism disposed only on the lateral side 48 of the first attachment arm 46.

The seat assembly 20 also includes a track locking mechanism 84 incorporated in the seat track assembly 42 for selectively locking and allowing sliding motion of the seat assembly 20 along the seat track assembly 42. The seat assembly 20 is moveable along the seat track assembly 42 from an origin point, as shown in FIG. 2, to a predetermined stop point, as shown in FIG. 16. One potential type of track locking mechanism for use in the seat assembly 20 is described in U.S. Pat. No. 8,967,719, the disclosure of which is hereby incorporated by reference in its entirety. It should be appreciated, however, that any suitable track locking mechanism 84 known in the art could be substituted without varying the scope of the invention. The seat track assembly 42 may also include a track spring 45 operably coupled between the seat base 40 and the seat track assembly 42 to bias the seat assembly 20 in a fore direction of the automotive vehicle toward the predetermined stop point.

Referring to FIGS. 5-10, a stopping mechanism 86 is operably coupled at the fifth pivot point P5 for variably limiting rotation between the front leg 38 and the seat cushion 30. The front leg 38 further includes a lateral side 88 and an opposite medial side 90. A shaft 92 at the fifth pivot point P5 extends axially between a first end 94 disposed at the lateral side 88 of the front leg 38 and a second end 96 disposed in the interior portion 71 of the seat cushion 30. A stopping cam 98 is fixedly coupled to the second end 96 of the shaft 92 and includes a cam surface 99 extending between a first radially extending stop lobe 100 and a second radially extending stop lobe 102, as shown in FIGS. 5, 7, 8, and 10. A stopper 104 extends axially from the seat cushion 30 into the interior portion 71 and is disposed between the first and second stop lobes 100, 102 such that the stopper 104 is restricted from traveling past either the first or second stop lobe 100, 102. Interaction of the stopper 104 with the first and second stop lobes 100, 102 during rotation of the seat cushion 30 therefore establishes rotational limits of the seat cushion 30 around the fifth pivot point P5, as demonstrated in FIGS. 8 and 10. Rotational limits of the seat cushion 30 around the fifth pivot point P5 can therefore be varied by rotation of the shaft 92, the stopping cam 98, and corresponding rotation of the first and second stop lobes 100, 102.

Figure 5:
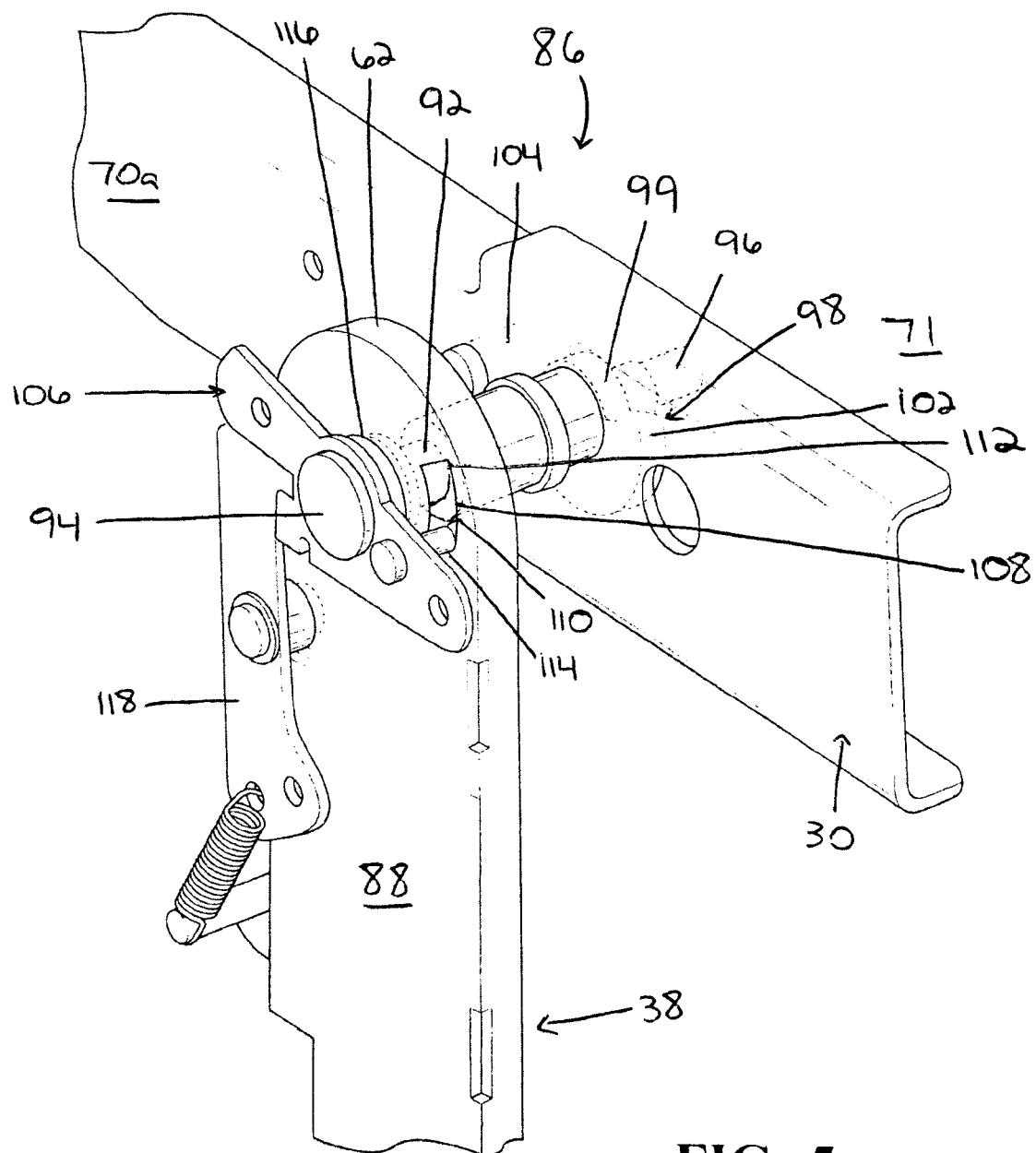
FIG. 5 is an enlarged fragmentary perspective view of a stopping mechanism of the seat assembly of FIG. 1.
Figure 6:
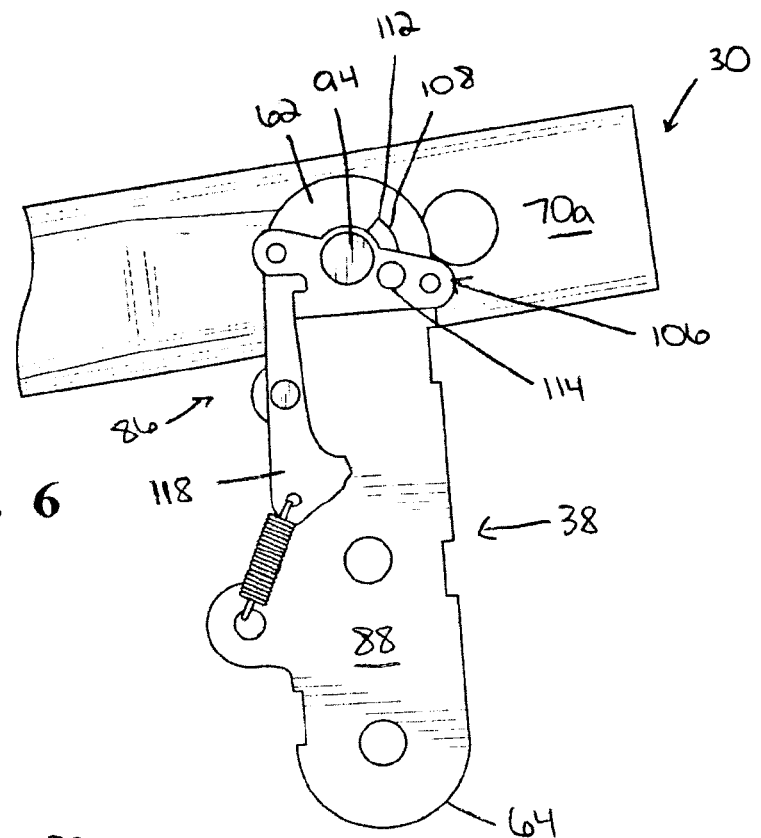
FIG. 6 is a fragmentary side view of the stopping mechanism of the seat assembly of FIG. 1 with a leader cam in a locked position.
Figure 7:
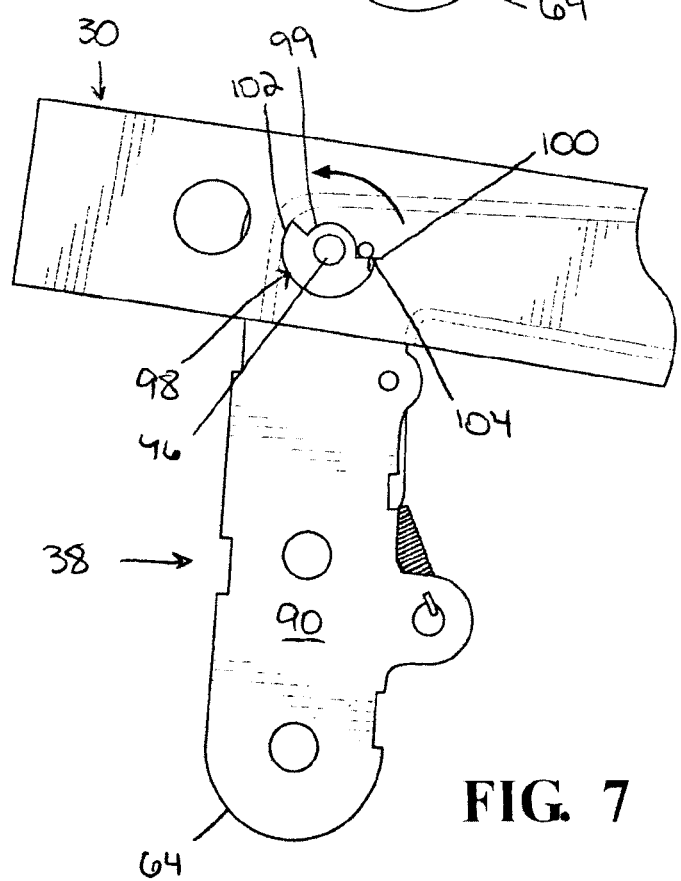
FIG. 7 is a fragmentary side view of the stopping mechanism of the seat assembly of FIG. 1 with a stopping cam disposed in a first position.
Figure 9:
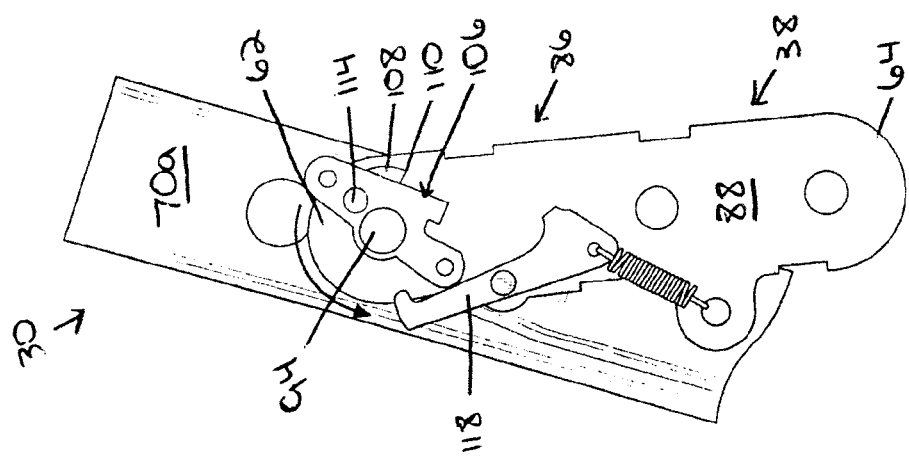
FIG. 9 is a fragmentary side view of the stopping mechanism of the seat assembly of FIG. 1 with the leader cam in an unlocked position.

Referring to FIG. 5, a leader cam 106 is fixedly coupled to the first end 94 of the shaft 92 adjacent the lateral side 88 of the front leg 38. The first end 62 of the front leg 38 further includes a projection cutout 108 with a first end 110 and an opposite second end 112. The projection cutout 108 receives a projection 114, such as a rivet, that extends from the leader cam 106. Interaction of the projection 114 with the first and second ends 110, 112 of the projection cutout 108 establishes rotational limits of the leader cam 106. A cam biasing mechanism 116, such as a torsion spring, is operably coupled to the leader cam 106 to rotatably bias the leader cam 106 in a first direction (counterclockwise when viewed from FIGS. 6 and 9). The leader cam 106 and the stopping cam 98 are both fixedly coupled to the shaft 92 such that rotation of the leader cam 106 simultaneously rotates both the shaft 92 and the stopping cam 98. Referring to FIGS. 5, 6, and 9, a locking cam 118 is rotatably coupled to the lateral side 88 of the front leg 38 for selectively engaging with the leader cam 106 to lock and unlock the leader cam 106, thereby selectively preventing and allowing corresponding rotation of the shaft 92 and the stopping cam 98.

Figure 10:
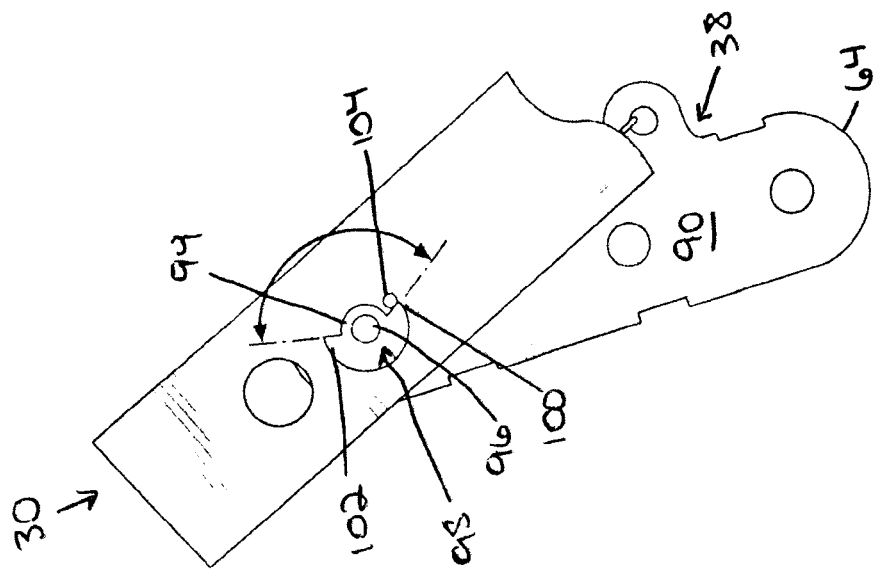
FIG. 10 is a fragmentary side view of the stopping mechanism of the seat assembly of FIG. 1 with the stopping cam disposed in a second position defining a second rotational range of the stopper and the seat cushion.
Figure 8:
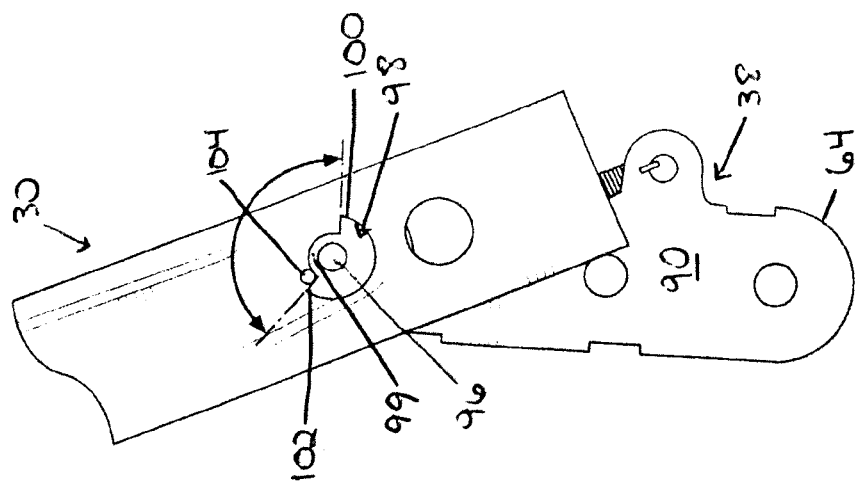
FIG. 8 is a fragmentary side view of the stopping mechanism of the seat assembly of FIG. 1 with the stopping cam disposed in the first position defining a first rotational range of a stopper and a seat cushion.

When the locking cam 118 is engaged with the leader cam 106, as shown in FIG. 6, the projection 114 is disposed at the first end 110 of the projection cutout 108 and the leader cam 106 cannot rotate. The stopping cam 98 is disposed in a first position defining a first rotational range of the stopper 104 between the first and second stop lobes 100, 102, therefore correspondingly limiting rotation of the seat cushion 30 to the first rotational range, as shown in FIG. 8. Actuation of the locking cam 118 disengages the locking cam 118 from the leader cam 106, and the leader cam 106 rotates in the first direction due to the cam biasing mechanism 116, as shown in FIG. 9. The projection 114 moves to the second end 112 of the projection cutout 108. The stopping cam 98 therefore correspondingly and simultaneously rotates to a second position defining a second rotational range of the stopper 104 between the first and second stop lobes 100, 102, therefore correspondingly limiting rotation of the seat cushion 30 to the second rotational range, as shown in FIG. 10.

Figure 14:
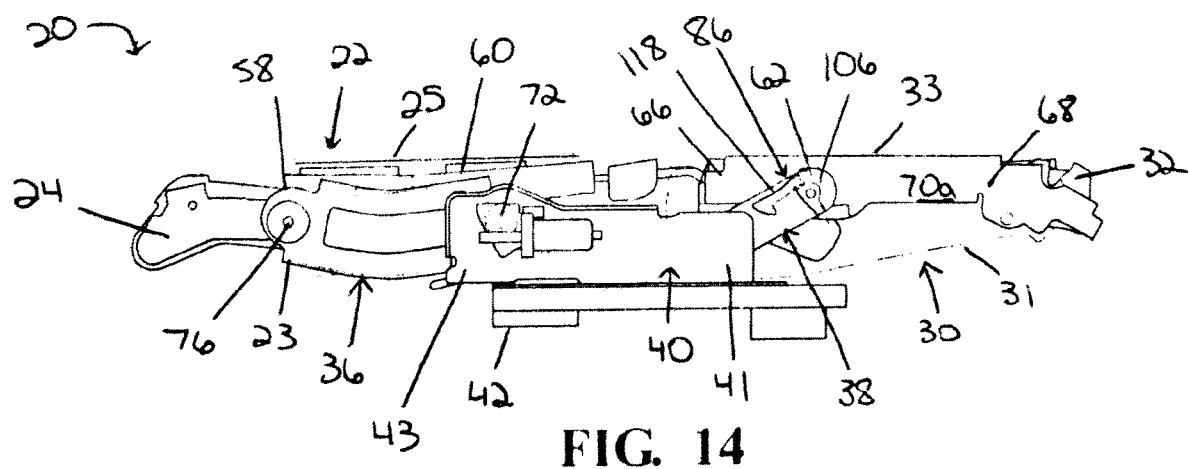
FIG. 14 is a side view of the seat assembly of FIG. 1 in the stow to floor position.
Figure 18:
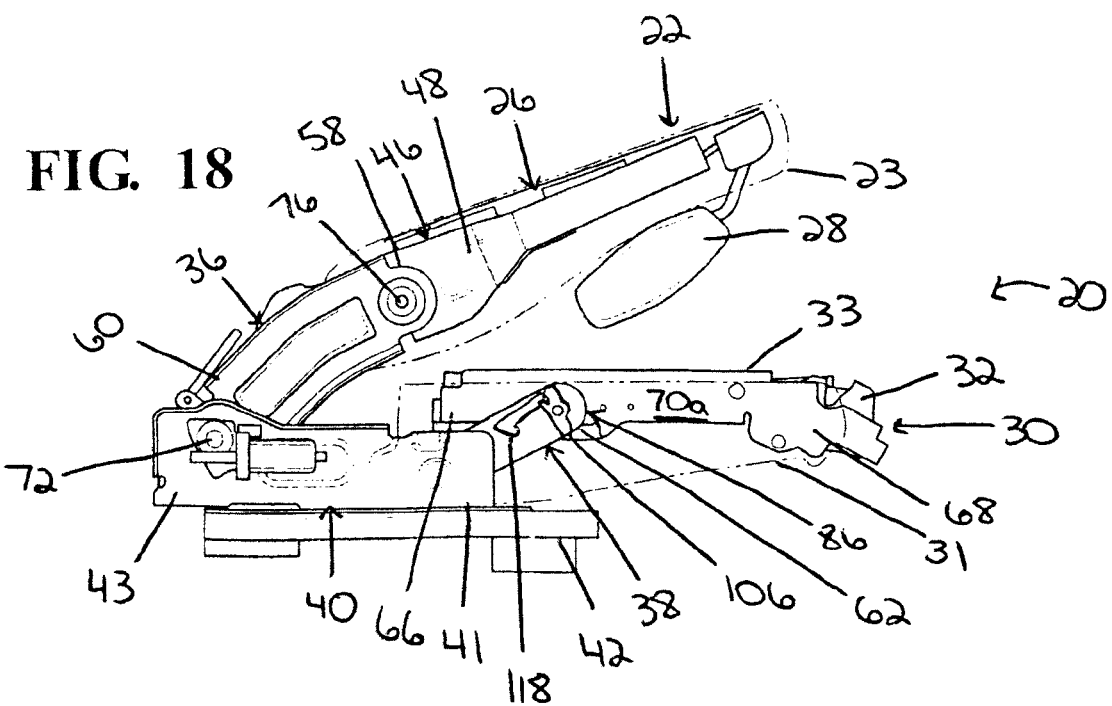
FIG. 18 is a side view of the seat assembly of FIG. 1 in the fold forward position.

The headrest 28 is typically disposed upright for supporting a head of the occupant in the automotive vehicle. However, as shown in FIGS. 14, 18, and 20, the headrest 28 is also capable of folding toward and overlapping the seat back 22. One potential type of mechanism for folding the headrest 28 is a cable and cam configuration described in U.S. Pat. No. 10,406,956, the disclosure of which is hereby incorporated by reference in its entirety. Alternatively, the headrest 28 can be folded independently with a strap, for example. It should be appreciated, however, that any suitable headrest folding mechanism known in the art could be substituted without varying the scope of the invention.

In one embodiment, conventional means of handle actuation known in the art, such as cable-type actuation assemblies, are used to selectively actuate the latching mechanism 32, first pivot locking mechanism 80, second pivot locking mechanism 76, third pivot locking mechanism 72, locking cam 118, and the track locking mechanism 84. These conventional means of handle actuation, combined with manual manipulation of the seat assembly by a user and assistance from various biasing mechanisms 74, 75, 78, 82, moves the seat assembly 20 between the plurality of positions. However, it should be appreciated that any number of alternative actuation mechanisms known in the art may be used without varying the scope of the invention. For example, referring to FIG. 21, an alternative embodiment of the seat assembly 20 uses a power drive system 120 for moving the seat assembly 20 between the plurality of positions, therefore requiring minimal manual manipulation of the seat assembly 20 by the user and no assistance from various biasing mechanisms 74, 75, 78, 82.

Figure 21:
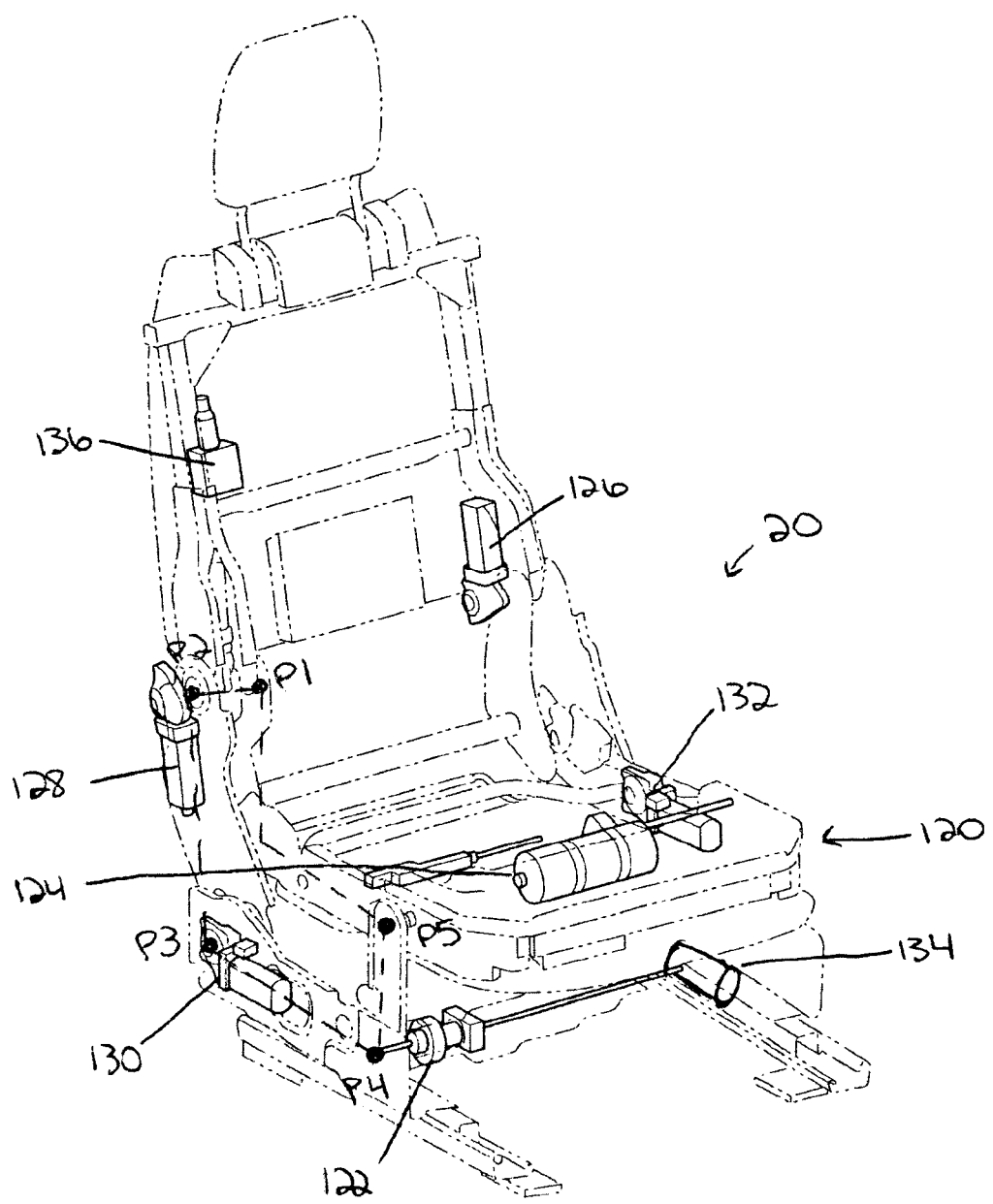
FIG. 21 is a perspective view of a seat assembly for use in an automotive vehicle in a design position according to an alternative embodiment of the present invention.

As shown in FIG. 21, the power drive system 120 includes a fourth pivot motor 122 disposed at the fourth pivot point P4 for rotation between the second end 64 of the front leg 38 and the front portion 41 of the seat base 40, and a fifth pivot motor 124 disposed at the fifth pivot point P5 for rotation between the first end 62 of the front leg 38 and the front portion 66 of the seat cushion 30. The first, second, and third pivot points P1, P2, P3 also have a corresponding first pivot motor 126, a second pivot motor 128, and a third pivot motor 130. The first pivot motor 126 actuates the first pivot locking mechanism 80 and provides rotation between the lower seat back portion 24 and the upper seat back portion 26. The second pivot motor 128 actuates the second pivot locking mechanism 76 and provides rotation between the upper seat back portion 26 and the first end 58 of the rear leg 36. Similarly, the third pivot motor 130 actuates the third pivot locking mechanism 72 and provides rotation between the second end 60 of the rear leg 36 and the rear portion 43 of the seat base 40. The power drive system 120 further includes a latching motor 132 operably coupled to the latching mechanism 32 for selectively unlocking the seat cushion 30 from the seat back 22, a track motor 134 operably coupled to the seat track assembly 42 for providing fore and aft sliding movement of the seat assembly 20 in the automotive vehicle, and a headrest motor 136 operably coupled to the headrest 28 for pivoting the headrest 28 relative to the seat back 22.

The seat assembly 20 provides for movement between the design position for supporting the occupant, the comfort recline position for increased occupant comfort, the easy entry position for increased ingress and egress behind the seat assembly, and a stow to floor position for increased cargo room in the automotive vehicle. Additionally, the power drive system 120 allows the seat assembly 20 to also move to the stadium position and the fold forward position. However, it should be appreciated that the seat assembly 20 may be moved to any number of positions not discussed herein. Referring to FIGS. 1 and 2, the seat assembly 20 is disposed in the design position for supporting the occupant in the automotive vehicle. In the design position, the stopping cam 98 is disposed in the first position, the seat cushion 30 is latched to the seat back 22 and spaced from the floor of the automatic vehicle, and the seat back 22 and headrest 28 are disposed generally upright to support the occupant. Further, the seat back 22 is disposed relatively perpendicular to the seat cushion 30. The latching mechanism 32, first pivot locking mechanism 80, second pivot locking mechanism 76, third pivot locking mechanism 72, and the track locking mechanism 84 remain locked to prevent movement of the five-bar linkage 34.

In operation, the seat assembly 20 is moveable to the comfort recline position, shown in FIGS. 11 and 12, in response to actuation of the first and second pivot locking mechanisms 76, 80. In the comfort recline position, the stopping cam 98 remains disposed in the first position and the seat cushion 30 remains spaced from the floor of the automotive vehicle. Actuation of the first and second pivot locking mechanisms 76, 80 allows rotation of the upper seat back portion 26 relative to the lower seat back portion 24 in the first direction (counterclockwise when viewed from FIGS. 11 and 12) at the first and second pivot points P1, P2 along axis A1. A user can then select a desired recline angle of the seat back 22, either by pushing rearwardly on the upper seat back portion 26 against the biasing force of the second pivot biasing mechanism 78, or via the power drive system 120.

Figure 13:
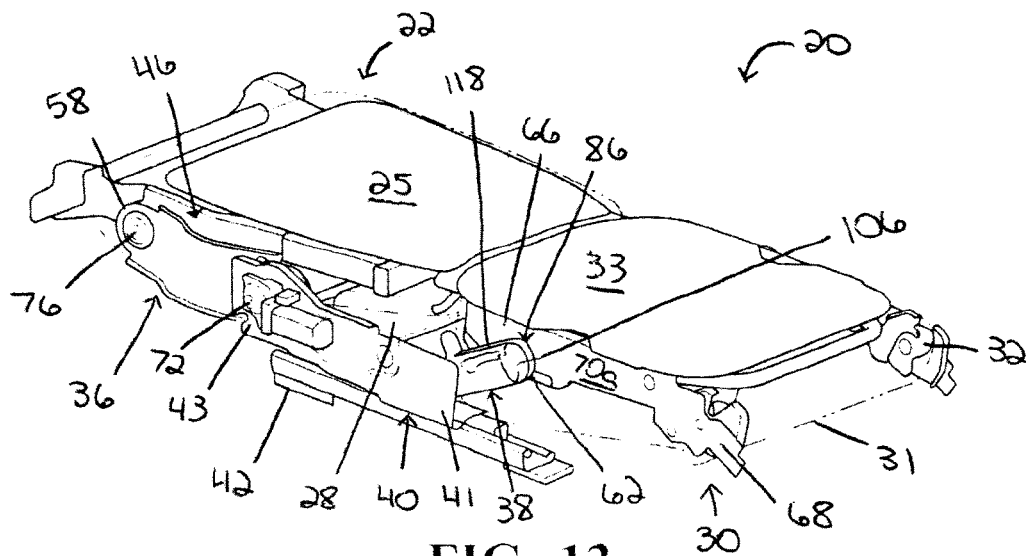
FIG. 13 is a perspective view of the seat assembly of FIG. 1 in a stow to floor position.

Referring to FIGS. 13 and 14, the seat assembly is moveable to the stow to floor position in response to actuation of the latching mechanism 32 and the second and third pivot locking mechanisms 76, 72. The locking cam 118 remains engaged with the leader cam 106, and the stopping cam 98 correspondingly remains disposed in the first position, therefore allowing the seat cushion 30 to rotate within the first rotational range shown in FIGS. 7 and 8. Actuation of the latching mechanism 32 releases the seat cushion 30 from the lower seat back portion 24, thereby unlocking the seat cushion 30 from the seat back 22. The headrest 28 correspondingly moves to the folded position. The seat cushion 30 rotates in the second direction (clockwise when viewed from FIGS. 13 and 14) at the fourth and fifth pivot points P4, P5 due to the biasing forces of the fourth and fifth pivot biasing mechanisms 82, 75. The seat cushion 30 flips and stows flat to the floor of the automotive vehicle such that the padded side 31 of the seat cushion 30 is engaged with or adjacent to the floor of the automotive vehicle, and the hard side 33 of the seat cushion 30 is disposed facing away from the floor of the automotive vehicle. Actuation of the second and third pivot locking mechanisms 76, 72 unlocks the rear leg 36 at the second and third pivot points P2, P3, thereby allowing rotation between the rear leg 36 and the seat base 40 and between the rear leg 36 and the seat back 22. The biasing force of second pivot biasing mechanism 78 rotates the seat back 22 in the second direction (clockwise when viewed from FIGS. 13 and 14). The user is then able to push rearwardly on the seat back 22 to overcome the biasing force of the third pivot biasing mechanism 74, rotating the rear leg 36 in the first direction (counterclockwise when viewed from FIGS. 13 and 14) to stow the seat back 22 to the floor of the automotive vehicle such that the padded side 23 of the seat back 22 is engaged with or adjacent to the floor of the automotive vehicle, and the hard side 25 of the seat back 22 is disposed facing away from the floor of the automotive vehicle. Alternatively, the seat assembly 20 can similarly move to the stow to floor position using the power drive system 120 with limited manual manipulation of the seat assembly 20 by the user and no assistance from various biasing mechanisms 74, 75, 78, 82. The seat assembly 20 is therefore disposed flat to the floor of the automotive vehicle, allowing increased cargo room in the automotive vehicle without having to remove the seat assembly 20 from the automotive vehicle or without having to stow the seat assembly 20 into a storage compartment or similar implement disposed beneath the vehicle floor.

In response to actuation of the second and third pivot locking mechanisms 76, 72, the locking cam 118, and the track locking mechanism 84, the seat assembly is moveable to the easy entry position, as shown in FIGS. 15 and 16. Actuation of the locking cam 118 disengages the locking cam 118 from the leader cam 106. The leader cam 106 rotates in the first direction (counterclockwise when viewed from FIGS. 15 and 16) due to the biasing force of the earn biasing mechanism 116, the projection 114 moves to the second end 112 of the projection cutout 108, and the stopping cam 98 simultaneously moves to the second position, therefore allowing the seat cushion 30 to rotate within the second rotational range shown in FIG. 10. Actuation of the third pivot locking mechanism 72 rotates the rear leg 36 in the second direction at the third pivot point P3 due to the biasing force of the third pivot biasing mechanism 74. Further, actuation of the track locking assembly 84 slides the seat assembly 20 along the seat track assembly 42 in the fore direction from the origin point to the predetermined stop point due to the biasing force of the track spring 45. The first pivot locking mechanism 80 and the latching mechanism 32 remain locked, and the seat assembly 20 therefore pitches forwardly and downwardly toward the floor of the automotive vehicle to allow ingress and egress behind the seat assembly 20. The seat back 22 remains disposed relatively perpendicular to the seat cushion 30 as in the design position, therefore allowing an implement such as a child seat to remain disposed on the seat assembly 20. Alternatively, the seat assembly 20 can similarly move to the easy entry position using the power drive system 120 with limited manual manipulation of the seat assembly 20 by the user and no assistance from various biasing mechanisms 74, 75, 78, 82.

Figure 17:
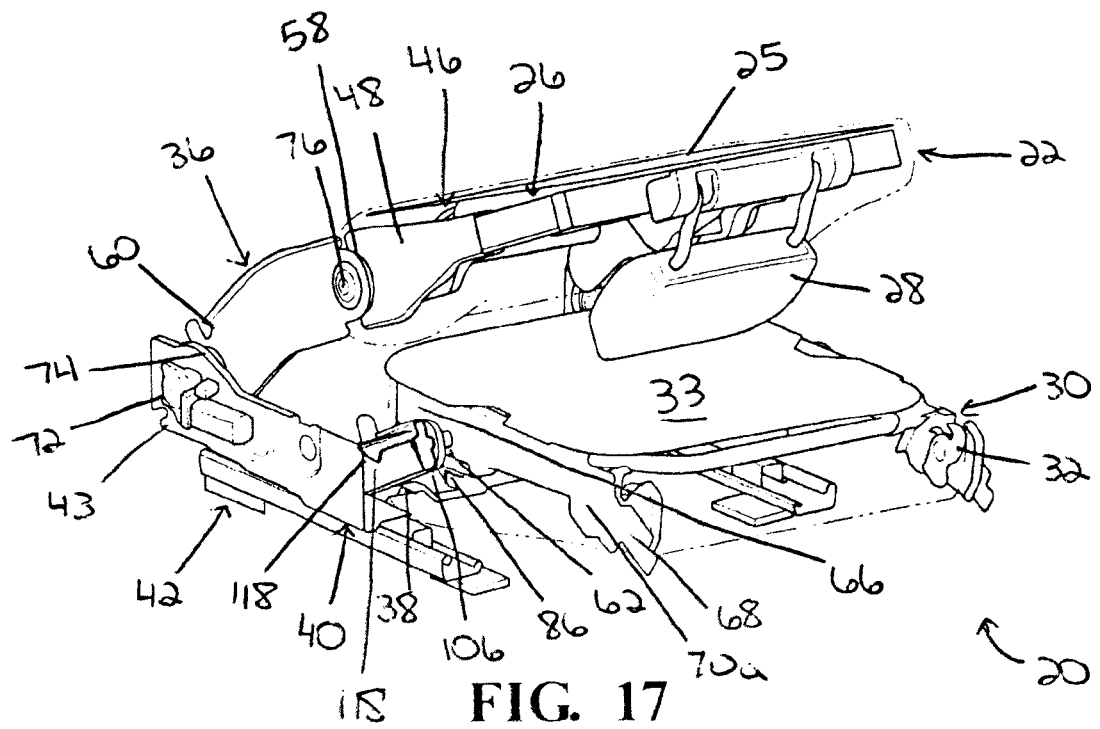
FIG. 17 is a perspective view of the seat assembly of FIG. 1 in a fold forward position.

In addition to the design, comfort recline, stow to floor, and easy entry positions, the seat assembly can also move to the stadium position and the fold forward position using the power drive system 120. Referring to FIGS. 17 and 18, the seat assembly is moveable to the fold forward position in response to actuation of the latching mechanism 32 and the third pivot locking mechanism 72 by the power drive system 120. Actuation of the latching mechanism 32 by the latching motor 132 releases the seat cushion 30 from the lower seat back portion 24, thereby unlocking the seat cushion 30 from the seat back 22. The headrest motor 136 correspondingly moves the headrest 28 to the folded position. The fourth and fifth pivot motors 122, 124 rotate the front leg 38 and the seat cushion 30 in the second direction (clockwise when viewed from FIGS. 17 and 18) at the fourth and fifth pivot points P4, P5 to flip and stow to the seat cushion 30 to the floor of the automotive vehicle. The padded side 31 of the seat cushion 30 is engaged with or adjacent to the floor of the automotive vehicle, and the hard side 33 of the seat cushion 30 is disposed facing away from the floor of the automotive vehicle. The third pivot motor 130 then rotates the rear leg 36 in the second direction (clockwise when viewed from FIGS. 17 and 18) at the third pivot point P3 to tilt the seat back 22 forwardly toward the floor of the automotive vehicle.

Additionally, as shown in FIGS. 19 and 20, the seat assembly 20 is also movable to the stadium position in response to activation of the latching mechanism 32 and the second and third pivot locking mechanisms 76, 72 by the power drive system 120. Actuation of the latching mechanism 32 by the latching motor 132 releases the seat cushion 30 from the lower seat back portion 24, thereby unlocking the seat cushion 30 from the seat back 22. The headrest motor 136 correspondingly moves the headrest 28 to the folded position. The fifth pivot motor 124 rotates the seat cushion 30 in the second direction (clockwise when viewed from FIGS. 19 and 20) at the fifth pivot point P5 to dispose the seat cushion 30 generally perpendicular to the floor of the automotive vehicle. Similarly, the third pivot motor 130 rotates the rear leg 36 in the second direction at the third pivot point P3, and the second pivot motor 128 rotates the seat back 22 in the first direction (counterclockwise when viewed from FIGS. 19 and 20) at the second pivot point P2 to dispose the seat back 22 generally perpendicular to the floor of the automotive vehicle.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A seat assembly adapted to be mounted to a floor of an automotive vehicle for movement between a plurality of positions, the seat assembly comprising:
   a seat cushion having a front portion and a rear portion for supporting an occupant in the automotive vehicle;
   a seat back including a lower seat back portion pivotally coupled to an upper seat back portion at a first pivot point (P1) defining a first axis (A1), the lower seat back portion releasably coupled to the rear portion of the seat cushion; and
   a five-bar linkage comprising
      a first link extending between a first end and an opposite second end, the first end rotatably coupled to the seat back at a second pivot point (P2) disposed coaxial to the first pivot point (P1), and the second end defining a third pivot point (P3),
      a second link extending axially between the first and second pivot points (P1, P2),
      a third link defined by the lower seat back portion and the seat cushion and extending between the first pivot point (P1) and a fifth pivot point (P5) disposed adjacent the front portion of the seat cushion,
      a fourth link extending between a first end and an opposite second end, the first end rotatably coupled to the third link at the fifth pivot point (P5), and the second end defining a fourth pivot point (P4), and
      a fifth link defined between the third pivot point (P3) and the fourth pivot point (P4).

2. The seat assembly of claim 1 further comprising a seat base extending between the third pivot point (P3) and the fourth pivot point (P4) for mounting the seat assembly in the automotive vehicle.

3. The seat assembly of claim 2 wherein the seat base is coupled to a seat track assembly for providing fore and aft movement of the seat assembly in the automotive vehicle.

4. The seat assembly of claim 3 further comprising a headrest pivotally coupled to the upper seat back portion, the headrest moveable between a generally upright position for supporting a head of an occupant and a folded position in which the headrest pivots toward the upper seat back portion.

5. The seat assembly of claim 4 further comprising a latching mechanism disposed between the lower seat back portion and the rear portion of the seat cushion for selectively unlocking the seat cushion from the seat back.

6. The seat assembly of claim 5 further comprising a third pivot locking mechanism operably coupled at the third pivot point (P3) for selectively locking the third pivot point (P3) and preventing rotation between the first link and the seat base.

7. The seat assembly of claim 6 further comprising a second pivot locking mechanism operably coupled at the second pivot point (P2) for selectively locking the second pivot point (P2) and preventing rotation between the upper seat back portion and the first link.

8. The seat assembly of claim 7 further comprising a first pivot locking mechanism operably coupled at the first pivot point (P1) for selectively locking the first pivot point (P1) and preventing rotation between the upper seat back portion and the lower seat back portion.

9. The seat assembly of claim 8 further comprising a track locking mechanism incorporated in the seat track assembly for selectively locking and preventing sliding motion of the seat assembly along the seat track assembly.

10. The seat assembly of claim 9 further comprising a stopping mechanism operably coupled at the fifth pivot point (P5) for variably limiting rotation between the fourth link and the seat cushion at the fifth pivot point (P5).

11. The seat assembly of claim 10 wherein the stopping mechanism includes
    a shaft extending between the fourth link and the seat cushion at the fifth pivot point (P5),
    a stopping cam disposed at a first end of the shaft, the stopping cam including a cam surface extending between a first radially extending stop lobe and a second radially extending stop lobe,
    a leader cam coupled to a second end of the shaft, wherein rotation of the leader cam simultaneously rotates the shaft and the stopping cam, and
    a stopper extending axially from the seat cushion between the first and second stop lobes of the stopping cam, wherein rotation of the seat cushion around the fifth pivot point (P5) is restricted as rotation of the stopper is correspondingly restricted between the first and second stop lobes.

12. The seat assembly of claim 11 further comprising a biasing mechanism operably coupled to the leader cam to rotatably bias the leader cam in a first direction.

13. The seat assembly of claim 12 further comprising a locking cam coupled to the fourth link for selectively locking the leader cam and preventing rotation of the shaft and the stopping cam.

14. The seat assembly of claim 13 wherein actuation of the locking cam rotates the stopping cam and the first and second stop lobes between a first position defining a first rotational range of the seat cushion around the fifth pivot point (P5), and a second position defining a second rotational range of the seat cushion around the fifth pivot point (P5).

15. The seat assembly of claim 14 further comprising a biasing mechanism at the second pivot point (P2) to rotatably bias the second pivot point (P2) in a second direction opposite the first direction.

16. The seat assembly of claim 15 further comprising a biasing mechanism at the third pivot point (P3) to rotatably bias the third pivot point (P3) in the second direction.

17. The seat assembly of claim 16 further comprising a biasing mechanism at the fourth pivot point (P4) to rotatably bias the fourth pivot point (P4) in the second direction.

18. The seat assembly of claim 17 further comprising a biasing mechanism at the fifth pivot point (P5) to rotatably bias the fifth pivot point (P5) in the second direction.

19. The seat assembly of claim 18 further comprising a biasing mechanism operably coupled between the seat base and the seat track assembly to bias the seat assembly in a fore direction along the seat track assembly.

20. The seat assembly of claim 19 wherein the seat assembly is disposed in a design position in which the stopping cam is disposed in the first position, the seat cushion is latched to the seat back and spaced from the floor of the automatic vehicle, and the seat back and headrest are disposed generally upright to support the occupant.

21. The seat assembly of claim 20 wherein the seat assembly is moveable to a comfort recline position in response to actuation of the first and second pivot locking mechanisms, wherein the stopping cam is disposed in the first position, the seat cushion is spaced from the floor of the automotive vehicle, and the upper seat back portion tilts in the first direction at the first and second pivot points (P1, P2) for increased occupant comfort.

22. The seat assembly of claim 21 wherein the seat assembly is moveable to an easy entry position in response to actuation of the second and third pivot locking mechanisms, the locking cam, and the track locking mechanism, wherein the stopping cam is disposed in the second position and the seat assembly tilts forwardly and downwardly toward the floor of the automotive vehicle and slides along the seat track assembly in the fore direction to allow ingress and egress behind the seat assembly.

23. The seat assembly of claim 22 wherein the seat assembly moves to a stow to floor position in response to actuation of the latching mechanism and the second and third pivot locking mechanisms, wherein the seat cushion unlocks from the seat back and the stopping cam is disposed in the first position, the seat cushion and the fourth link rotate in the second direction at the fourth and fifth pivot points (P4, P5), the headrest moves to the folded position, the seat back rotates in the second direction at the second pivot point (P2), and the first link rotates in the first direction at the third pivot point (P3), such that the seat cushion and seat back are stowed flat to the floor of the automotive vehicle.

24. The seat assembly of claim 23 wherein the seat assembly moves to a fold forward position in response to actuation of the latching mechanism and the third pivot locking mechanism, wherein the seat cushion unlocks from the seat back and the stopping cam is disposed in the first position, the seat cushion and the fourth link rotate in the second direction at the fourth and fifth pivot points (P4, P5) to stow the seat cushion flat on the floor of the automotive vehicle, the headrest moves to the folded position, and the first link rotates in the second direction at the third pivot point (P3) to tilt the seat back forwardly toward the floor of the automotive vehicle.

25. The seat assembly of claim 24 wherein the seat assembly moves to a stadium position in response to actuation of the latching mechanism and the second and third pivot locking mechanisms, wherein the seat cushion unlocks from the seat back and the stopping cam is disposed in the first position, and the seat cushion and the seat back rotate in the second direction at the third and fifth pivot points (P3, P5) and in the first direction at the second pivot point (P2) such that the seat cushion and the seat back are disposed generally perpendicular to the floor of the automotive vehicle.

26. The seat assembly of claim 25 further comprising a first actuator motor operably coupled at the first pivot point (P1) for actuating the first pivot locking mechanism and providing rotation between the lower seat back portion and the upper seat back portion.

27. The seat assembly of claim 26 further comprising a second actuator motor operably coupled at the second pivot point (P2) for actuating the second pivot locking mechanism and providing rotation between the upper seat back portion and the first link.

28. The seat assembly of claim 27 further comprising a third actuator motor operably coupled at the third pivot point (P3) for actuating the third pivot locking mechanism and providing rotation between the first link and the seat base.

29. The seat assembly of claim 28 further comprising a fourth actuator motor operably coupled at the fourth pivot point (P4) for providing rotation between the fourth link and the seat base.

30. The seat assembly of claim 29 further comprising a fifth actuator motor operably coupled at the fifth pivot point (P5) for providing rotation between the seat cushion and the fourth link.

31. The seat assembly of claim 30 further comprising a sixth actuator motor operably coupled at the latching mechanism for selectively unlocking the seat cushion from the seat back.

32. The seat assembly of claim 31 further comprising a seventh actuator motor operably coupled at the headrest for pivoting the headrest relative to the seat back.

33. The seat assembly of claim 32 further comprising an eighth actuator motor operably coupled at the seat track assembly for providing fore and aft sliding movement of the seat assembly in the automotive vehicle.

* * * * *